(12) United States Patent
Teng

(10) Patent No.: US 12,565,448 B2
(45) Date of Patent: Mar. 3, 2026

(54) CONTINUOUS AND FULLY-AUTOMATIC ENERGY-SAVING PRODUCTION LINE AND METHOD FOR VACUUM GLASS

(71) Applicant: QINGDAO ZHONGTENG ZHIYUAN VACUUM GLASS TECHNOLOGY DEVELOPMENT CO., LTD., Qingdao (CN)

(72) Inventor: Shaobo Teng, Qingdao (CN)

(73) Assignee: QINGDAO ZHONGTENG ZHIYUAN VACUUM GLASS TECHNOLOGY DEVELOPMENT CO., LTD., Qingdao (CN)

( * ) Notice: Subject to any disclaimer, the term of this patent is extended or adjusted under 35 U.S.C. 154(b) by 0 days.

(21) Appl. No.: 18/728,473

(22) PCT Filed: Mar. 28, 2023

(86) PCT No.: PCT/CN2023/084234
§ 371 (c)(1),
(2) Date: Jul. 12, 2024

(87) PCT Pub. No.: WO2024/027175
PCT Pub. Date: Feb. 8, 2024

(65) Prior Publication Data
US 2025/0074817 A1 Mar. 6, 2025

(30) Foreign Application Priority Data
Aug. 3, 2022 (CN) .......................... 202210925248.3

(51) Int. Cl.
*C03C 27/06* (2006.01)
*B32B 37/04* (2006.01)
(Continued)

(52) U.S. Cl.
CPC .......... *C03C 27/06* (2013.01); *B32B 37/0053* (2013.01); *B32B 37/04* (2013.01); *B32B 37/06* (2013.01);
(Continued)

(58) Field of Classification Search
None
See application file for complete search history.

(56) References Cited

U.S. PATENT DOCUMENTS

2013/0291599 A1 11/2013 Zhao et al.
2021/0354433 A1 11/2021 Fan et al.

FOREIGN PATENT DOCUMENTS

CN 203572208 U 4/2014
CN 106277729 A 1/2017
(Continued)

*Primary Examiner* — Linda L Gray
(74) *Attorney, Agent, or Firm* — Bayramoglu Law Offices LLC

(57) ABSTRACT

A continuous and fully-automatic energy-saving production line and method for vacuum glass are provided. The production line includes conveying roller tables that run through the entire production line, and includes a feeding platform, a low-vacuum pumping chamber, a high-vacuum pumping chamber, a main processing chamber, a high-vacuum automatic cooling chamber, a first-stage boosting and automatic cooling chamber, and a second-stage boosting and automatic cooling chamber in sequence. The main processing chamber is integrally welded, and cylindrical in shape, with two sides respectively provided with inspection holes; the low-vacuum pumping chamber and the high-vacuum pumping chamber are connected to form a degassing section; the high-vacuum automatic cooling chamber, the first-stage boosting and automatic cooling chamber, and the second-stage boosting and automatic cooling chamber form a cooling section; and the degassing section and the
(Continued)

cooling section are respectively connected to two ends of the main processing chamber through sealing doors.

1 Claim, 3 Drawing Sheets

(51) Int. Cl.
  *B32B 37/06*       (2006.01)
  *B32B 37/08*       (2006.01)
  *B32B 39/00*       (2006.01)
  *C03C 27/04*       (2006.01)
  *C03C 27/08*       (2006.01)
  *B32B 37/00*       (2006.01)
  *B32B 37/10*       (2006.01)
(52) U.S. Cl.
  CPC ........... *B32B 37/08* (2013.01); *B32B 37/1009* (2013.01); *B32B 37/1018* (2013.01); *B32B 37/187* (2013.01); *B32B 39/00* (2013.01); *C03C 27/04* (2013.01); *C03C 27/042* (2013.01); *C03C 27/046* (2013.01); *C03C 27/08* (2013.01)

(56) References Cited

FOREIGN PATENT DOCUMENTS

| CN | 111138095 A | 5/2020 |
|---|---|---|
| CN | 212199020 U | 12/2020 |
| CN | 212400564 U | 1/2021 |
| CN | 112777952 A | 5/2021 |
| CN | 213102965 U | 5/2021 |
| CN | 215409119 U | 1/2022 |
| CN | 215667743 U | 1/2022 |
| CN | 115246715 A | 10/2022 |
| JP | 2014503463 A | 2/2014 |
| JP | 2014509296 A | 4/2014 |
| WO | 2020050302 A1 | 3/2020 |

CONTINUOUS AND FULLY-AUTOMATIC ENERGY-SAVING PRODUCTION LINE AND METHOD FOR VACUUM GLASS

CROSS-REFERENCE TO THE RELATED APPLICATIONS

This application is the national phase entry of International Application No. PCT/CN2023/084234, filed on Mar. 28, 2023, which is based upon and claims priority to Chinese Patent Application No. 202210925248.3, filed on Aug. 3, 2022, the entire contents of which are incorporated herein by reference.

TECHNICAL FIELD

The present disclosure relates to a continuous and fully-automatic energy-saving production line and method for vacuum glass, and belongs to the technical field of vacuum glass manufacture.

BACKGROUND

Vacuum glass is a new type of highly processed glass product developed based on the principle of thermoses. The structure of vacuum glass is similar to that of insulated glass, with the exception that there is rarified gas in the chamber of the vacuum glass, almost close to vacuum.

Vacuum glass is formed by two or more flat glass panels and can be used in buildings, home appliances, solar energy, and other fields that require heat and sound insulation. As a new type of energy-saving material for buildings, the vacuum glass that is based on the principle of thermoses is formed by sealing two glass panels with low-melting-point glass powder and performing pumping-out to form a high-vacuum chamber of 10-2 Pa or more.

Vacuum glass has excellent heat and sound insulation performance, high sunlight transmittance, high infrared light reflectivity, and high chemical stability. It features heat insulation, anti-condensation, sound insulation, energy conservation, environmental friendliness, and high value added. As a new generation of energy-saving material, vacuum glass can be widely used in a variety of fields such as mid-to-high-end buildings, household appliances, transportation (vehicles and ships), and solar energy utilization, demonstrating broad market prospects. However, there are some problems in the prior art. For example, the one-step vacuum glass production line proposed by Chinese patent application 2020201385534 has the following problems.

1. The production line cannot achieve continuous production, and needs transfer devices between each step, resulting in low production efficiency.

2. The roller tables that run through the production line adopt a step-by-step conveying method, which cannot achieve continuous production. In addition, the vacuum glass runs and stops during the step-by-step process, which can easily cause problems such as glass breakage.

3. The production line needs to be dismantled completely from top to bottom during maintenance to replace the roller tables and heating tubes, resulting in very low maintenance efficiency and greatly affecting production efficiency.

4. The square working chamber lacks devices such as heat insulation system and infrared heating tube for vacuum glass heating.

5. The production chamber is a square chamber, which cannot provide stable ambient temperature during heating, and the temperature in the chamber may be affected by the temperature outside the chamber during production, which may cause a decrease in the yield of finished products.

SUMMARY

A technical problem to be solved by the present disclosure is to overcome the shortcomings in the prior art. For this purpose, the present disclosure provides a continuous and fully-automatic energy-saving production line and method for vacuum glass. The present disclosure achieves fully-automatic production, reduces glass breakage, improves maintenance and production efficiency, and reduces power consumption.

In the present disclosure, the continuous and fully-automatic energy-saving production line for vacuum glass includes conveying roller tables that run through an entire production line, where the production line includes a feeding platform, a low-vacuum pumping chamber, a high-vacuum pumping chamber, a main processing chamber, a high-vacuum automatic cooling chamber, a first-stage boosting and automatic cooling chamber, and a second-stage boosting and automatic cooling chamber in sequence;

the main processing chamber is integrally welded, and cylindrical in shape, with two sides respectively provided with inspection holes; the low-vacuum pumping chamber and the high-vacuum pumping chamber are connected to form a degassing section; the high-vacuum automatic cooling chamber, the first-stage boosting and automatic cooling chamber, and the second-stage boosting and automatic cooling chamber form a cooling section; and the degassing section and the cooling section are respectively connected to two ends of the main processing chamber through sealing doors;

the low-vacuum pumping chamber, the high-vacuum pumping chamber, the high-vacuum automatic cooling chamber, the first-stage boosting and automatic cooling chamber, and the second-stage boosting and automatic cooling chamber form an integrally welded, sealed rectangular-solid structure, with two sides respectively provided with inspection holes; and sealing doors are provided between each two of the low-vacuum pumping chamber, the high-vacuum pumping chamber, the main processing chamber, the high-vacuum automatic cooling chamber, the first-stage boosting and automatic cooling chamber, and the second-stage boosting and automatic cooling chamber in sequence; and the low-vacuum pumping chamber and the second-stage boosting and automatic cooling chamber each are separated from an outside by a sealing door.

Further, two sides of each of the main processing chamber, the low-vacuum pumping chamber, the high-vacuum pumping chamber, the high-vacuum automatic cooling chamber, the first-stage boosting and automatic cooling chamber, and the second-stage boosting and automatic cooling chamber are respectively provided with inspection holes.

Further, the main processing chamber includes sections 3 # to 8 # in which infrared heating tubes are provided for heating vacuum glass; temperatures increase in ascending order from the section 3 # to the section 7 #; the section 8 # is configured for low-temperature heating at 100-300° C.; and the low-vacuum pumping chamber includes a section 1 #, the high-vacuum pumping chamber includes a section 2 #, the high-vacuum automatic cooling chamber includes sections 9 # and 10 #, the first-stage boosting and automatic cooling chamber includes a section 11 #, and the second-stage boosting and automatic cooling chamber includes a section 12 #.

Further, the sections 3 # to 8 # of the cylindrical main processing chamber each are provided with a heat insulation system; the heat insulation system in the section 7 # is provided with a temperature regulating device; the roller table drives glass to pass through the heat insulation system, such that the heat insulation system insulates an interior of the glass through an insulation plate; and the temperature regulating device in the heat insulation system is configured to cool down the insulation plate to a set temperature.

Further, the heat insulation system includes an infrared ray heating tube; the infrared ray heating tube is located in the heat insulation system; and two ends of the infrared ray heating tube extend into the inspection holes.

Further, the roller table extends into the heat insulation system, and two ends of a roller track of the roller table extend into the inspection holes.

Further, an opening of the inspection hole is sealed by a sealing plate; the sealing plate is provided with a detection hole; a temperature measuring device is provided at a bottom and a top of a chamber body; and a through-beam switch is provided in the detection hole.

Further, the sections 3 # to 8 # in the main processing chamber are heating sections, and the sections 9 # to 12 # are cooling sections; and sealing doors are provided between the section 10 # and the section 11 #, as well as between the section 11 # and the section 12 #.

Further, the roller tables are driven by an electric motor to run continuously; the roller tables in each of the feeding platform, the low-vacuum pumping chamber, the high-vacuum pumping chamber, the main processing chamber, the high-vacuum automatic cooling chamber, the first-stage boosting and automatic cooling chamber, and the second-stage boosting and automatic cooling chamber are connected to each other; and there are roller tables connected to each other between a cooling platform and an automatic unloading line, and on an automatic loading line.

In the present disclosure, the continuous and fully-automatic energy-saving production method for vacuum glass is implemented by the continuous and fully-automatic energy-saving production line for vacuum glass, and includes the following steps:

vacuum glass loading: laminating, by the automatic loading line, one piece of glass coated with a solder with the other piece of glass to form vacuum glass; loading the vacuum glass; and evenly mounting, by a clamp mounting machine, clamps around the vacuum glass;

vacuum glass vacuum-pumping: lifting, by a feeding lifting platform, the vacuum glass to the feeding platform; driving the vacuum glass on the feeding platform to move forward; and meanwhile, opening the sealing door of the low-vacuum pumping chamber, such that the feeding platform with the vacuum glass is transferred to the roller table in the low-vacuum pumping chamber;

driving the vacuum glass on the roller table in the low-vacuum pumping chamber to move forward in the low-vacuum pumping chamber; meanwhile, closing the sealing door of the low-vacuum pumping chamber; starting, after the sealing door is closed, a vacuum pumping unit in the low-vacuum pumping chamber to operate until the low-vacuum pumping chamber reaches a vacuum of 10 pa within a specified time; and opening the sealing door between the high-vacuum pumping chamber and the low-vacuum pumping chamber;

transferring the vacuum glass from the roller table in the low-vacuum pumping chamber to the roller table in the high-vacuum pumping chamber, and continuously moving the vacuum glass forward; closing, after the vacuum glass completely enters the high-vacuum pumping chamber, the sealing door between the high-vacuum pumping chamber and the low-vacuum pumping chamber; starting, after the sealing door is closed, a vacuum pumping unit in the high-vacuum pumping chamber to operate until the high-vacuum pumping chamber reaches a vacuum of 0.05 pa within a specified time; and opening the sealing door between the high-vacuum pumping chamber and the main processing chamber;

transferring the vacuum glass from the roller table in the high-vacuum pumping chamber to the roller table in the main processing chamber, and continuously moving the vacuum glass forward; closing, after the vacuum glass completely enters the main processing chamber, the sealing door between the high-vacuum pumping chamber and the main processing chamber; continuously moving the sealed glass on the roller table forward after the sealing door is closed; and meanwhile, heating, by the infrared heating tube in the main processing chamber, the vacuum glass;

heating the vacuum glass in the section 7 # to a melting point of the solder, such that the solder melts; allowing the solder of the vacuum glass to condense in the section 8 # in which the solder does not reach the melting temperature, thereby isolating external and internal spaces of the vacuum glass; and allowing the vacuum glass moving in the sections 9 # and 10 # to automatically cool down;

opening the sealing door between the section 10 # and the section 11 # after the vacuum glass enters the section 10 # such that the section 10 # and the section 11 # have a same vacuum; closing the sealing door between the section 10 # and the section 11 # after the vacuum glass completely enters the section 11 #, and opening the sealing door between the section 11 # and the section 12 # to increase an air pressure in the section 11 #; closing the sealing door between the section 11 # and the section 12 # after the vacuum glass completely enters the section 12 #, and performing pumping-out in the section 11 # until an air pressure of 0.05 pa that is close to an air pressure in the section 10 #; opening the sealing door between the section 12 # and the outside, such that an air pressure in the section 12 # restores to a standard atmospheric pressure; moving the vacuum glass out of the section 12 # through the roller table; closing the sealing door between the section 12 # and the outside after the vacuum glass is moved out of the section 12 #; and performing pumping-out in the section 12 # until an air pressure of 10 pa;

conveying the vacuum glass to a discharge lifting platform through the roller table; conveying the vacuum glass to a cooling platform through the discharge lifting platform and a transfer chamber; driving the vacuum glass to a clamp dismounting machine through the roller table; and unloading the clamps; and conveying the vacuum glass to the automatic unloading line through the roller table, and unloading the vacuum glass on the automatic unloading line.

Beneficial Effects

1. The present disclosure modifies the structure of a vacuum glass production line by replacing an original square chamber with a cylindrical main processing chamber. The low-vacuum pumping chamber, the high-vacuum pumping chamber, the high-vacuum automatic cooling chamber, the first-stage boosting and automatic cooling chamber, and the second-stage boosting and automatic cooling chamber connected at two ends are square chambers. The diameter of the main processing chamber is consistent with the width of the low-vacuum pumping chamber, the high-vacuum pumping chamber, the high-vacuum automatic cooling chamber, the first-stage boosting and automatic cooling chamber, and the second-stage boosting and automatic cooling chamber. The space, especially the longitudinal space, in the main processing chamber is much larger than the space in the square chamber. The main processing chamber has a sufficient space to install an insulation layer for isolating convective heat, thereby reducing heat loss and lowering the operating power of the infrared heating tube. The design reduces the power consumption of the infrared heating tube for maintaining the temperature, greatly reducing power consumption. Although the space in the main processing chamber is large, the required vacuum can be achieved only through one-time evacuation before production begins. The energy consumption required to maintain the vacuum in the subsequent production process is exactly the same as that of the existing square chamber. When the energy consumption for evacuation before production is evenly distributed among the daily energy consumption for evacuation, it is negligible, so the design will not cause excess energy consumption.

2. The present disclosure achieves continuous operation through the low-vacuum pumping chamber, the high-vacuum pumping chamber, the main processing chamber, the first-stage boosting and automatic cooling chamber, and the second-stage boosting and automatic cooling chamber, reducing the impact on the vacuum glass during the working process and reducing vacuum glass breakage.

3. The present disclosure modifies the structure of each chamber in the vacuum glass production line. Firstly, in order to improve sealing performance, the chamber is modified from a lower tank-upper cover structure to an integrally welded structure. The sealing effect of the welded structure is better than that of the upper cover sealing ring structure, and it is easy to process, improving the sealing performance of the chamber. The original structure needs to open the upper cover during maintenance. In the improved structure, due to the inspection holes provided at the two sides of the chamber, the maintenance method has two main advantages, namely convenient maintenance and high sealing anti-negative-pressure performance. As is well known, the most vulnerable parts of vacuum glass production lines are the infrared heating tubes and roller tables. By opening the sealing plates of the inspection holes at two sides, the two ends of the infrared heating tube and the roller table are exposed. By loosening the fixing device from two ends, the component can be easily removed from one side for replacement. For replacement, the existing chamber needs to be opened with the upper cover, and then the infrared heating tube and the roller table need to be removed layer by layer from top to bottom. In contrast, the present disclosure greatly shortens the maintenance time.

In addition, compared to the existing up-down cover structure, the integrated welding structure greatly improves the sealing performance of the chamber. The resistance of the cylindrical structure to atmospheric pressure is much greater than that of the rectangular-solid structure. Therefore, the main processing chamber can ensure compressive strength without the need for additional reinforcement bars, simplifying the welding process of reinforcement bars and saving reinforcement bars, offsetting the cost increase caused by the cylindrical structure in terms of materials.

Figure 1:
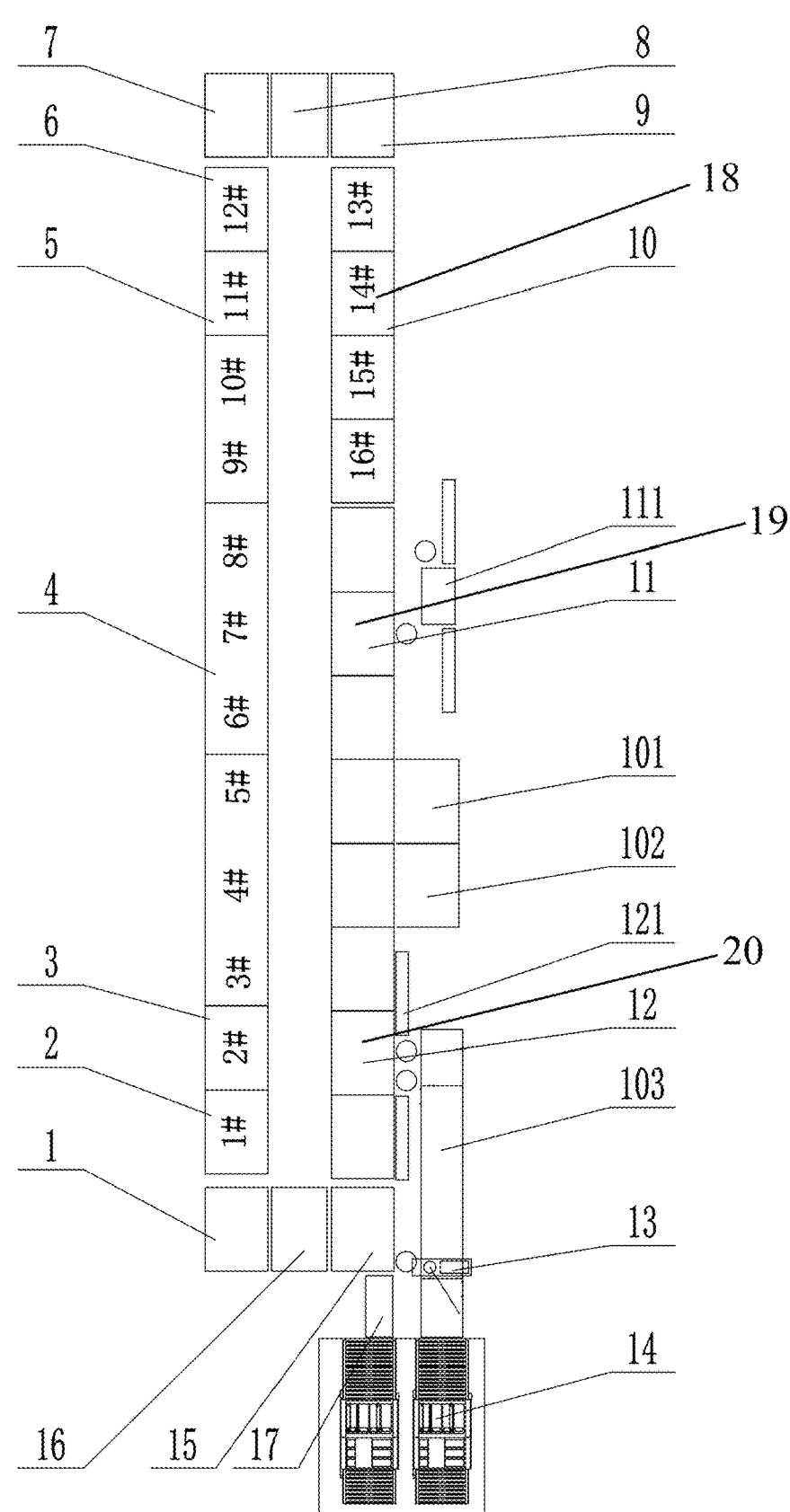
FIG. 1 is a structural diagram according to Embodiment 1 of the present disclosure.

Reference Numerals: 1. feeding platform; 2. low-vacuum pumping chamber; 3. high-vacuum pumping chamber; 4. main processing chamber; 5. first-stage boosting and automatic cooling chamber; 6. second-stage boosting and automatic cooling chamber; 7. discharge platform; 8. discharge lifting platform; 9. discharge transfer chamber; 10. cooling area; 11. unloading line area; 12. loading line area; 13. material bin; 14. cleaning machine; 15. feeding transfer chamber; 16. feeding lifting platform; 17. laminating device; 18. cooling platform; 19. automatic unloading line; 20. automatic loading line; 21. chamber body; 22. insulation plate; 23. through-beam switch; 25. conveying roller tables; and 26. roller track;

41. heat insulation system; 42. infrared ray heating tube; 43. inspection hole; 44. sealing plate; 45. detection hole; and 46. temperature regulating device; and 101. broken glass discharge platform; 102. bracket replenishment platform; 103. positioning platform; 111. clamp dismounting machine; and 121. clamp mounting machine.

DETAILED DESCRIPTION OF THE EMBODIMENTS

Embodiment 1

Figure 2:
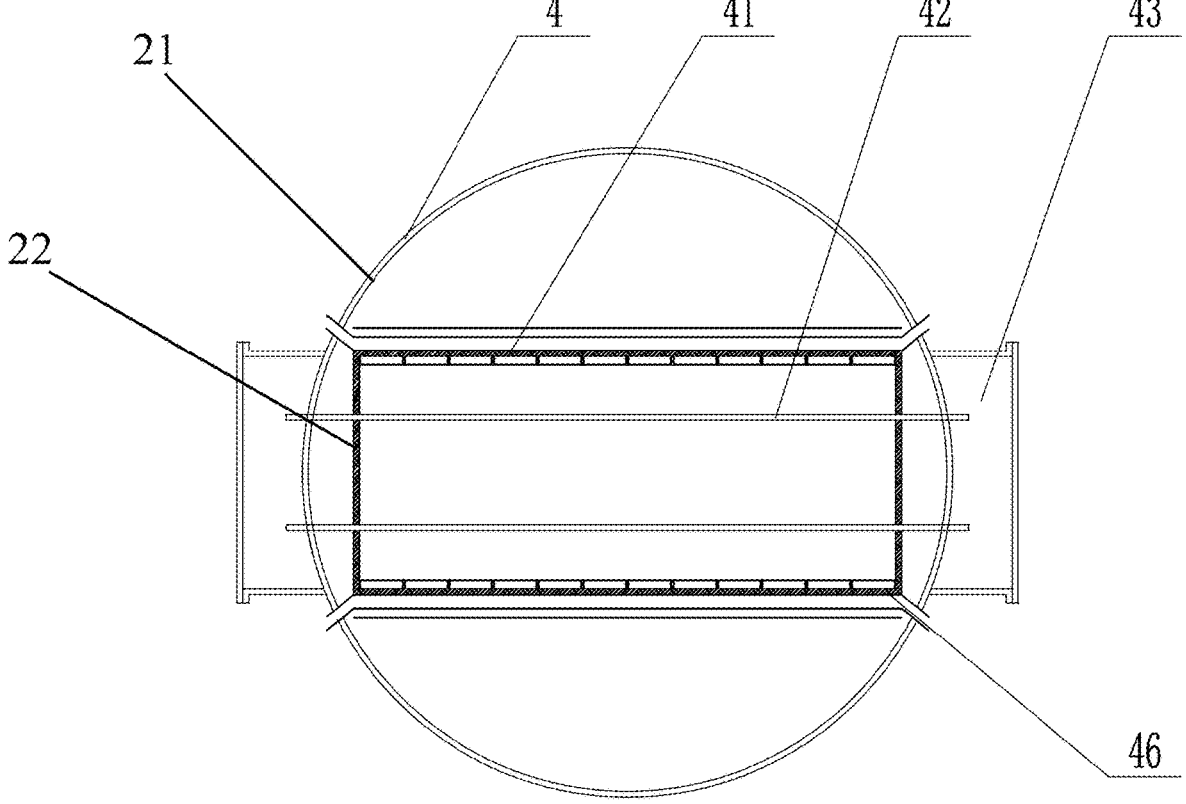
FIG. 2 is a structural diagram of a main processing chamber according to the present disclosure.
Figure 3:
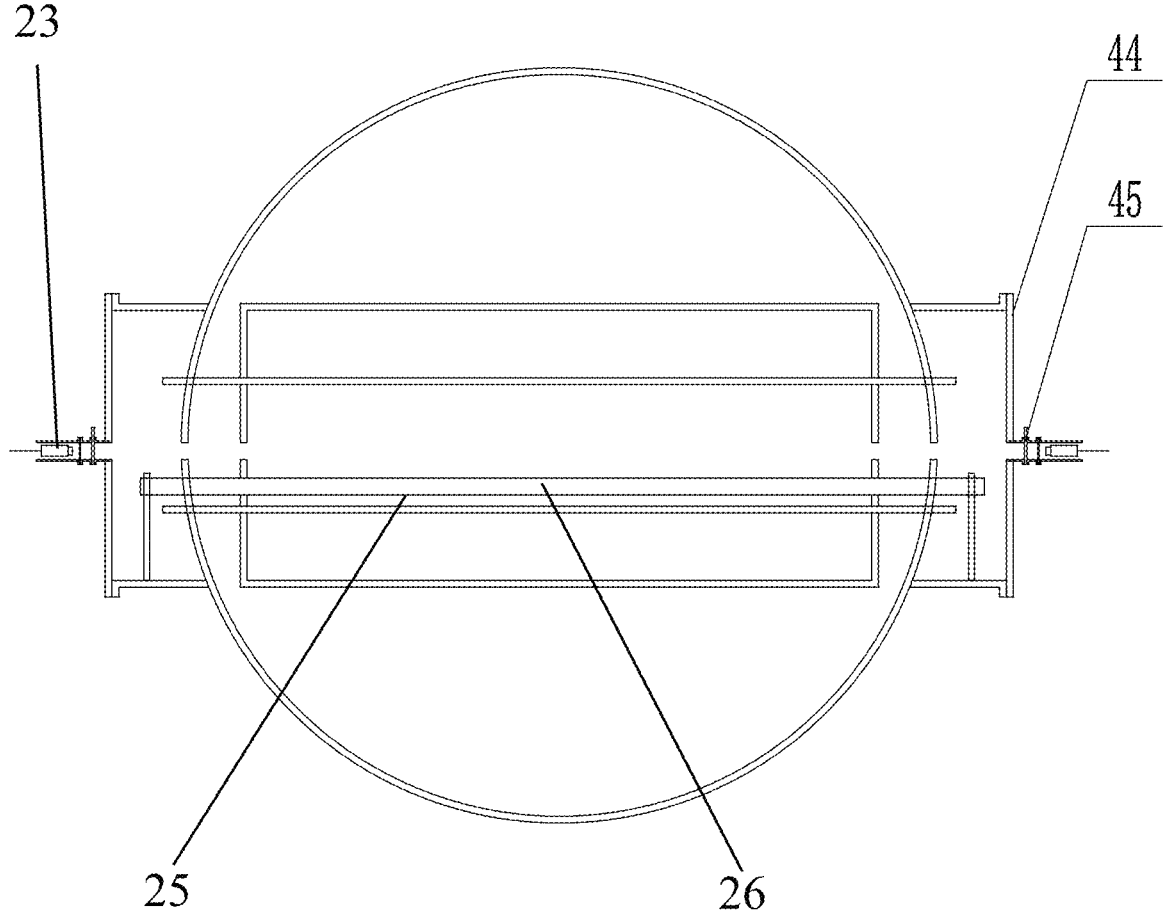
FIG. 3 is a structural diagram of an inspection hole of the main processing chamber according to the present disclosure.

As shown in FIGS. 1 to 3, a continuous and fully-automatic energy-saving production line for vacuum glass includes conveying roller tables 25 that run through an entire production line. The production line includes feeding platform 1, low-vacuum pumping chamber 2, high-vacuum pumping chamber 3, main processing chamber 4, high-vacuum automatic cooling chamber, first-stage boosting and automatic cooling chamber 5, and second-stage boosting and automatic cooling chamber 6 in sequence.

The main processing chamber 4 is integrally welded, and cylindrical in shape, with two sides respectively provided with inspection holes 43. The low-vacuum pumping chamber 2 and the high-vacuum pumping chamber 3 are connected to form a degassing section. The high-vacuum automatic cooling chamber, the first-stage boosting and automatic cooling chamber 5, and the second-stage boosting and automatic cooling chamber 6 form a cooling section. The degassing section and the cooling section are respectively connected to two ends of the main processing chamber 4 through sealing doors.

The low-vacuum pumping chamber 2, the high-vacuum pumping chamber 3, the high-vacuum automatic cooling chamber, the first-stage boosting and automatic cooling chamber 5, and the second-stage boosting and automatic cooling chamber 6 form an integrally welded, sealed rect-angular-solid structure, with two sides respectively provided with inspection holes 43.

Sealing doors are provided between each two of the low-vacuum pumping chamber 2, the high-vacuum pumping chamber 3, the main processing chamber 4, the high-vacuum automatic cooling chamber, the first-stage boosting and automatic cooling chamber 5, and the second-stage boosting and automatic cooling chamber 6 in sequence. The low-vacuum pumping chamber 2 and the second-stage boosting and automatic cooling chamber 6 each are separated from an outside by a sealing door.

Two sides of each of the main processing chamber 4, the low-vacuum pumping chamber 2, the high-vacuum pumping chamber 3, the high-vacuum automatic cooling chamber, the first-stage boosting and automatic cooling chamber 5, and the second-stage boosting and automatic cooling chamber 6 are respectively provided with inspection holes 43.

The main processing chamber 4 includes sections 3 # to 8 #. Infrared heating tubes are provided in the sections 3 # to 8 # for heating vacuum glass. Temperatures increase in ascending order from the section 3 # to the section 7 #. The section 8 # is configured for low-temperature heating at 200-300° C. The low-vacuum pumping chamber 2 includes section 1 #, the high-vacuum pumping chamber 3 includes section 2 #, the high-vacuum automatic cooling chamber includes sections 9 # and 10 #, the first-stage boosting and automatic cooling chamber 5 includes section 11 #, and the second-stage boosting and automatic cooling chamber 6 includes section 12 #.

The sections 3 # to 8 # of the cylindrical main processing chamber 4 each are provided with heat insulation system 41. The heat insulation system in the section 7 # is provided with a temperature regulating device. The roller table drives glass to pass through the heat insulation system 41. The heat insulation system 41 insulates an interior of the glass through an insulation plate 22. The heat insulation system 41 is provided with the temperature regulating device 46. The temperature regulating device 46 is configured to cool the insulation plate 22 to a set temperature.

The heat insulation system 41 includes infrared ray heating tube 42. The infrared ray heating tube 42 is located in the heat insulation system 41, and two ends of the infrared ray heating tube 42 respectively extend into the inspection holes 43.

The roller table extends into the heat insulation system 41, and two ends of a roller track 26 of the roller table extend into the inspection holes 43.

An opening of the inspection hole 43 is sealed by sealing plate 44. The sealing plate 44 is provided with detection hole 45. A temperature measuring device is provided at a bottom and a top of a chamber body 21, and a through-beam switch 23 is provided in the detection hole 45.

In the main processing chamber 4, the sections 3 # to 8 # are heating sections, and the sections 9 # to 12 # are cooling sections. Sealing doors are provided between the section 10 # and the section 11 #, as well as between the section 11 # and the section 12 #.

The roller tables are driven by an electric motor to run continuously. The roller tables in each of the feeding platform 1, the low-vacuum pumping chamber 2, the high-vacuum pumping chamber 3, the main processing chamber 4, the high-vacuum automatic cooling chamber, the first-stage boosting and automatic cooling chamber 5, and the second-stage boosting and automatic cooling chamber 6 are connected to each other. There are roller tables connected to each other between a cooling platform 18 and an automatic unloading line 19, and on an automatic loading line 20.

As shown in FIGS. 1 to 3, a continuous and fully-automatic energy-saving production method for vacuum glass includes the following steps.

Vacuum lass loading. One piece of glass coated with a solder is laminated with the other piece of glass on the automatic loading line 20 to form vacuum glass. The vacuum glass is loaded. Clamps are evenly mounted around the vacuum glass by a clamp mounting machine.

Vacuum glass vacuum-pumping. The vacuum glass is lifted to the feeding platform by a feeding lifting platform. The vacuum glass on the feeding platform is driven to move forward. Meanwhile, the sealing door of the low-vacuum pumping chamber 2 is opened, such that the feeding platform with the vacuum glass is transferred to the roller table in the low-vacuum pumping chamber 2.

The vacuum glass on the roller table in the low-vacuum pumping chamber 2 is driven to move forward in the low-vacuum pumping chamber 2. Meanwhile, the sealing door of the low-vacuum pumping chamber 2 is closed. After the sealing door is closed, a vacuum pumping unit in the low-vacuum pumping chamber 2 is started to operate until the low-vacuum pumping chamber 2 reaches a vacuum of 10 pa within a specified time. The sealing door between the high-vacuum pumping chamber 3 and the low-vacuum pumping chamber 2 is opened.

The vacuum glass is transferred from the roller table in the low-vacuum pumping chamber 2 to the roller table in the high-vacuum pumping chamber 3, and is continuously moved forward. After the vacuum glass completely enters the high-vacuum pumping chamber 3, the sealing door between the high-vacuum pumping chamber 3 and the low-vacuum pumping chamber 2 is closed. After the sealing door is closed, a vacuum pumping unit in the high-vacuum pumping chamber 3 is started to operate until the high-vacuum pumping chamber 3 reaches a vacuum of 0.05 pa within a specified time. The sealing door between the high-vacuum pumping chamber 3 and the main processing chamber 4 is opened.

The vacuum glass is transferred from the roller table in the high-vacuum pumping chamber 3 to the roller table in the main processing chamber 4, and is continuously moved forward. After the vacuum glass completely enters the main processing chamber 4, the sealing door between the high-vacuum pumping chamber 3 and the main processing chamber 4 is closed. The sealed glass on the roller table forward is continuously moved after the sealing door is closed. Meanwhile, the vacuum glass is heated by the infrared heating tube in the main processing chamber 4.

The vacuum glass in the section 7 # is heated to a melting point of the solder, such that the solder melts. The solder of the vacuum glass condenses in the section 8 # in which the solder does not reach the melting temperature, thereby isolating external and internal spaces of the vacuum glass. The vacuum glass moving in the sections 9 # and 10 # automatically cools down.

The sealing door between the section 10 # and the section 11 # is opened after the vacuum glass enters the section 10 # such that the section 10 # and the section 11 # have a same vacuum. The sealing door between the section 10 # and the section 11 # is closed after the vacuum glass completely enters the section 11 #, and the sealing door between the section 11 # and the section 12 # is opened to increase an air pressure in the section 11 #. The sealing door between the section 11 # and the section 12 # is closed after the vacuum glass completely enters the section 12 #, and pumping-out is performed in the section 11 # until an air pressure of 0.05 pa that is close to an air pressure in the section 10 #. The sealing door between the section 12 # and the outside is opened, such that an air pressure in the section 12 # restores to a standard atmospheric pressure. The vacuum glass is moved out of the section 12 # through the roller table. The sealing door between the section 12 # and the outside is closed after the vacuum glass is moved out of the section 12 #. Pumping-out is performed in the section 12 # until an air pressure of 10 pa.

The vacuum glass is conveyed to a discharge lifting platform through the roller table, and is conveyed to a cooling platform 18 through the discharge lifting platform and a transfer chamber. The vacuum glass is driven to a clamp dismounting machine through the roller table, and the clamps are dismounted.

The vacuum glass is conveyed to the automatic unloading line 19 through the roller table, and is unloaded on the automatic unloading line 19. The working process or principle is as follows.

The glass panel enters the roller table from bracket replenishment platform 102. The glass panel enters loading line area 11 and is clamped through the clamp mounting machine 121.

After clamping, the glass panel enters positioning platform 103. After positioning, the glass panel enters cleaning machine 14 and is laminated by laminating device 17. After the lamination is completed, the glass panel is conveyed to the feeding lifting platform 16 through feeding transfer chamber 15, and gradually evacuated in the 1 # section of the low-vacuum pumping chamber 2 and the 2 # section of the high-vacuum pumping chamber 3 in sequence. Then the vacuum glass enters the main processing chamber 4 (including the high-vacuum processing chamber in the sections 3 # to 8 #) and the high-vacuum automatic cooling chamber in the sections 9 # and 10 #, and is gradually heated up to discharge internal air. After moving to the section 7 #, the glass panel reaches the melting point of the solder, and the solder melts. After passing through the section 8 #, the vacuum glass gradually cools down, and the solder condenses to isolate the external and internal spaces of the vacuum glass. The first-stage boosting and automatic cooling chamber 5 in the section 11 # and the second-stage boosting and automatic cooling chamber 6 in the section 12 # gradually cool down and boost the vacuum glass until it reaches atmospheric pressure. The processed vacuum glass is conveyed to the discharge lifting platform 8 through discharge platform 7.

After lifting, the glass panel is conveyed from discharge transfer chamber 9 to cooling area 10. The cooling area includes sections 13 # to 16 #. After cooling, the glass panel enters the unloading line area 11. In the unloading line area 11, the clamps are dismounted by the nearby clamp dismounting machine 111. Finally, complete vacuum glass is sent out from the bracket replenishment platform 102, and broken glass is directly sent out from broken glass discharge platform 101.

In the present disclosure, the description of the direction and relative positional relationship of the structure, such as front, back, left, right, top, and bottom, does not constitute a limitation on the present disclosure and is only for convenience of description.

What is claimed is:

1. A continuous and fully-automatic production method for vacuum glass, implemented by a continuous and fully-automatic production line comprising the following steps:

vacuum glass loading: laminating one piece of glass coated with a solder with another piece of glass to form vacuum glass, and loading the vacuum glass with clamps mounted around the vacuum glass;

vacuum glass vacuum-pumping: lifting the vacuum glass to a feeding platform; driving the vacuum glass on the feeding platform to move forward; and meanwhile, opening a first sealing door of a low-vacuum pumping chamber, wherein the feeding platform with the vacuum glass is transferred to the low-vacuum pumping chamber;

driving the vacuum glass in the low-vacuum pumping chamber to move forward in the low-vacuum pumping chamber; meanwhile, closing the first sealing door of the low-vacuum pumping chamber; after the first sealing door is closed, pumping a vacuum in the low-vacuum pumping chamber until the low-vacuum pumping chamber reaches a vacuum of 10 Pa within a predetermined time; and opening a second sealing door between a high-vacuum pumping chamber and the low-vacuum pumping chamber;

transferring the vacuum glass from the low-vacuum pumping chamber to the high-vacuum pumping chamber, and continuously moving the vacuum glass forward; closing, after the vacuum glass completely enters the high-vacuum pumping chamber, the second sealing door between the high-vacuum pumping chamber and the low-vacuum pumping chamber; after the second sealing door is closed, pumping a vacuum in the high-vacuum pumping chamber until the high-vacuum pumping chamber reaches a vacuum of 0.05 Pa within a predetermined time; and opening a third sealing door between the high-vacuum pumping chamber and a main processing chamber;

transferring the vacuum glass from the high-vacuum pumping chamber to the main processing chamber, and continuously moving the vacuum glass forward; closing, after the vacuum glass completely enters the main processing chamber, the third sealing door between the high-vacuum pumping chamber and the main processing chamber; continuously moving the vacuum glass forward after the third sealing door is closed; and meanwhile, heating the vacuum glass by an infrared heating tube in the main processing chamber;

heating the vacuum glass to a melting point of the solder, wherein the solder melts; moving the vacuum glass to an area in which the solder does not reach a melting temperature and allowing the solder of the vacuum glass to condense, wherein external and internal spaces of the vacuum glass are isolated; and allowing the vacuum glass to automatically cool down in an automatic cooling chamber;

restoring the automatic cooling chamber to a standard atmospheric pressure; moving the vacuum glass out from the automatic cooling chamber; closing a fourth sealing door to an outside after the vacuum glass is moved out from the automatic cooling chamber;

conveying the vacuum glass to a discharge lifting platform; and unloading the vacuum glass.

* * * * *